(12) United States Patent
Lu et al.

(10) Patent No.: US 9,965,088 B2
(45) Date of Patent: May 8, 2018

(54) TOUCH CONTROL DISPLAY DEVICE AND MANUFACTURING METHOD THEREOF

(71) Applicants: Shanghai Tianma Micro-Electronics Co., Ltd, Shanghai (CN); TIANMA MICRO-ELECTRONICS CO., LTD., Shenzhen (CN)

(72) Inventors: Feng Lu, Shanghai (CN); Xu Qian, Shanghai (CN); Wenxin Jiang, Shanghai (CN); Junchao Ma, Shanghai (CN); Yong Wu, Shanghai (CN)

(73) Assignees: Shanghai Tianma Micro-Electronics Co., Ltd., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 220 days.

(21) Appl. No.: 15/006,139

(22) Filed: Jan. 26, 2016

(65) Prior Publication Data
US 2016/0266706 A1 Sep. 15, 2016

(30) Foreign Application Priority Data
Mar. 9, 2015 (CN) .......................... 2015 1 0102656

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01)

(58) Field of Classification Search
None
See application file for complete search history.

(56) References Cited

U.S. PATENT DOCUMENTS

| 2005/0091179 A1 | 4/2005 | Kalthoff et al. |
| 2010/0013745 A1* | 1/2010 | Kim ...................... G06F 3/0412 345/76 |
| 2011/0304583 A1 | 12/2011 | Kruglick |

(Continued)

FOREIGN PATENT DOCUMENTS

| CN | 101561609 A | 10/2009 |
| CN | 101582422 A | 11/2009 |

(Continued)

*Primary Examiner* — Joseph Haley
*Assistant Examiner* — Emily Frank
(74) *Attorney, Agent, or Firm* — Kilpatrick Townsend & Stockton LLP

(57) ABSTRACT

A touch control display device is provided. The touch control device includes: a display area including a gate electrode, a plurality of gate lines, a source electrode, a drain electrode, a plurality of source lines, a plurality of conversion lines, and a plurality of common electrodes. A first via hole may be formed on the gate line and exposes at least a portion of the gate line, and a second via hole may be formed on the common electrode and exposes at least a portion of the common electrodes. The plurality of conversion lines may include a plurality of first conversion lines and a plurality of second conversion lines. The plurality of first conversion lines may be electrically connected to the plurality of gate lines via the first via hole, and the plurality of second conversion lines may be electrically connected to the plurality of common electrodes via the second via hole.

15 Claims, 10 Drawing Sheets

(56) References Cited

U.S. PATENT DOCUMENTS

2015/0091015 A1* 4/2015 Park ................. H01L 27/124
　　　　　　　　　　　　　　　　　257/72
2016/0246399 A1* 8/2016 Huang ................ G06F 3/044
2016/0294386 A1* 10/2016 Yang ................. G06F 3/0416

FOREIGN PATENT DOCUMENTS

CN　　103677406 A　　3/2014
CN　　104134429 A　　11/2014

\* cited by examiner

US 9,965,088 B2

TOUCH CONTROL DISPLAY DEVICE AND MANUFACTURING METHOD THEREOF

CROSS-REFERENCE TO RELATED APPLICATIONS

This application is based upon and claims priority to Chinese Patent Application 201510102656.9, filed on Mar. 9, 2015, the entire contents of which are incorporated herein by reference.

TECHNICAL FIELD

The present disclosure generally relates to a field of touch control, and more particularly, to a touch control display device and a manufacturing method thereof.

BACKGROUND

In the related art, a liquid crystal display generally includes a display panel having a plurality of data lines, a plurality of gate lines (or referred to as scan lines) intersecting the plurality of data lines, and pixel units arranged in a matrix form. Further, a thin film transistor (TFT) is provided at an intersection of one data line and one gate line. In an embodiment, a gate electrode of the TFT is electrically connected to the gate line, a source electrode of the TFT is electrically connected to the data line, and a drain electrode of the TFT is electrically connected to a pixel electrode. In addition, the display panel may be further provided with a gate driver sequentially supplying gate driving signal to the gate lines and a source driver supplying data voltage signal to the data lines. An active area of a typical liquid crystal display is generally in a rectangular shape, and the gate driving signal and a source driving signal (i.e., the data voltage signal) are driven using different drivers or an integral driving chip. However, a gate shift register receiving signals from the driving chip is generally located in a non-active area at both sides of the active area of the display panel, and transmits gate scan signals via the scan lines in the active area of the gate shift register, respectively.

A touch display screen, as an input media, is a simple and convenient means of human-machine interaction. Accordingly, more and more products have a touch display function integrated in the liquid crystal display. However, wires for providing touch control signals of touch control electrodes have to pass through the non-active area at both sides of the display panel, which further increases the bezel area of the display panel.

SUMMARY

A technical solution is provided in the present disclosure, which in particular includes the content as follows.

There is provided a touch control display device including:

a display area and a non-display area, the display area including a gate metal layer, a source/drain metal layer, a conversion layer and a common electrode layer, the gate metal layer including a gate electrode and a plurality of gate lines, the source/drain metal layer including a source electrode, a drain electrode and a plurality of source lines, the conversion layer including a plurality of conversion lines, and the common electrode layer including a plurality of common electrodes that are independent from one another, wherein a first via hole is formed on the gate line and exposes at least a portion of the gate line, and a second via hole is formed on the common electrode and exposes at least a portion of the common electrodes, wherein the plurality of gate lines intersect the plurality of source lines, and the plurality of conversion lines have an extension direction parallel to that of the plurality of source lines, and wherein the plurality of conversion lines include a plurality of first conversion lines and a plurality of second conversion lines, the plurality of first conversion lines are electrically connected to the plurality of gate lines via the first via hole, and the plurality of second conversion lines are electrically connected to the plurality of common electrodes via the second via hole.

Embodiments of the present disclosure further provides a manufacturing method of a touch control display device, the method including:

providing a base substrate;

forming, on the base substrate, a thin film transistor element layer including a gate metal layer and a source/drain electrode metal layer, wherein the gate metal layer includes a gate electrode and a plurality of gate lines, and the source/drain electrode metal layer includes a source electrode, a drain electrode and a plurality of source lines;

forming a common electrode layer on the thin film transistor element layer, and patterning the common electrode layer to form a plurality of common electrodes that are independent from one another;

forming a third insulation layer on the common electrode and the thin film transistor element layer;

forming a conversion layer on the third insulation layer, and patterning the conversion layer to form a plurality of conversion lines including a plurality of first conversion lines and a plurality of second conversion lines; and forming on the gate line a first via hole that exposes at least a portion of the gate line, and forming on the common electrode a second via hole that exposes at least a portion of the common electrode, wherein the plurality of first conversion lines are electrically connected to the plurality of gate lines via the first via hole, and the plurality of second conversion lines are electrically connected to the plurality of common electrodes via the second via hole.

Embodiments of the present disclosure further provides another manufacturing method of a touch control display device, the method including:

providing a base substrate;

forming, on the base substrate, a thin film transistor element layer including a gate metal layer and a source/drain electrode metal layer, wherein the gate metal layer includes a gate electrode and a plurality of gate lines, and the source/drain electrode metal layer includes a source electrode, a drain electrode and a plurality of source lines;

patterning the thin film transistor element layer to form on the gate line a first via hole that exposes at least a portion of the gate line;

forming a pixel electrode layer and a conversion layer on the thin film transistor element layer;

patterning the conversion layer and the pixel electrode layer to form a pixel electrode, a plurality of first conversion lines and a plurality of second conversion lines, wherein the plurality of first conversion lines are electrically connected to the plurality of gate lines via the first via hole;

forming a third insulation layer on the first conversion line, the second conversion line and the pixel electrode;

patterning the third insulation layer to form on the second conversion line a second via hole that exposes at least a portion of the second conversion line; and forming a common electrode layer on the third insulation layer and patterning the common electrode layer to form a plurality of common electrodes that are independent from one another, wherein the common electrode is electrically connected to the second conversion line via the second via hole.

BRIEF DESCRIPTION OF THE DRAWINGS

The drawings used for describing the embodiments are briefly described hereinafter for a more clear understanding of the technical solution of the embodiment of the present disclosure. Obviously, the drawings in the following description are merely some embodiments of the present disclosure, and other drawings may be obtained by those skilled in the art based on these drawings without creative labor.

DETAILED DESCRIPTION

The technical solutions of the embodiments of the present disclosure will be described clearly and fully with reference to the drawings in the embodiments of the present disclosure. Obviously, described embodiments are merely some embodiments of the present disclosure rather than all embodiments of the present disclosure. Based on the embodiments of the present disclosure, all the other embodiments, obtained by those skilled in the art without creative labor, are involved in the protection scope of the present disclosure.

Figure 1:
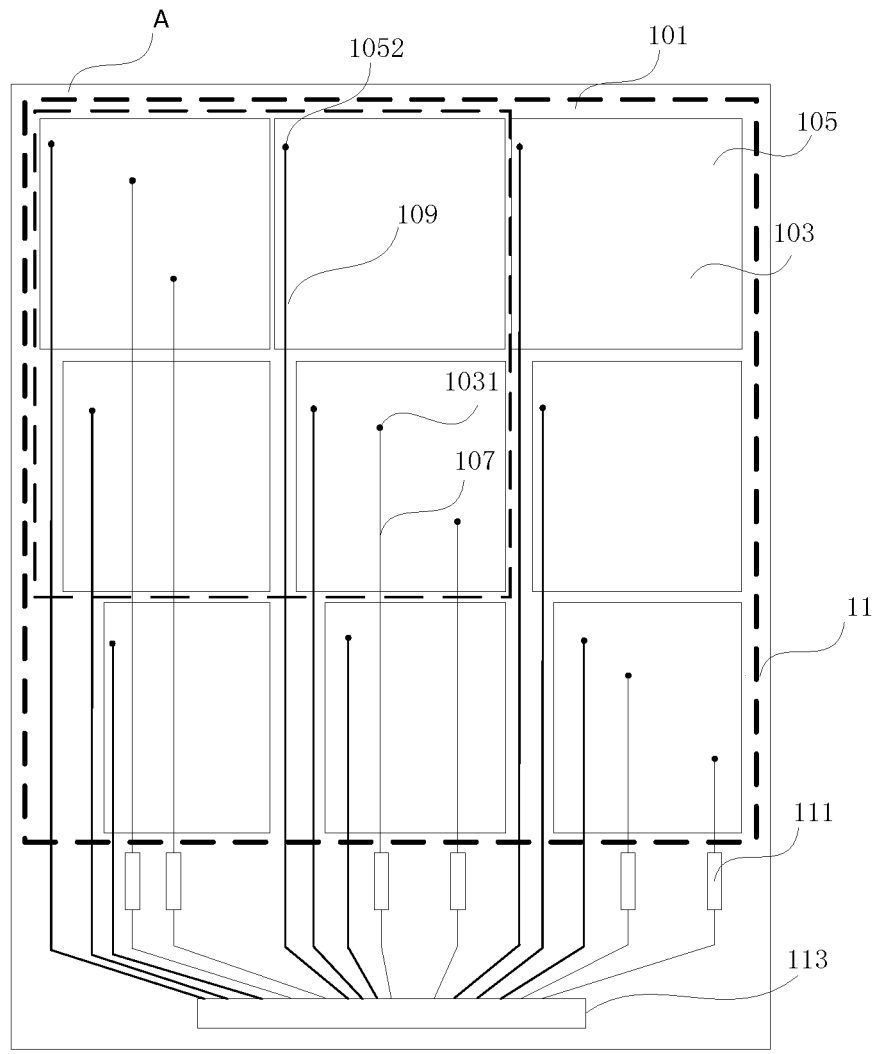
FIG. 1 is a plan view of a touch control display device provided in an embodiment of the present disclosure.

FIG. 1 is a plan view of a touch control display device provided in an embodiment of the present disclosure. The touch control display device includes a display area 101 (an area within the dashed block of FIG. 1) and a non-display area (an area outside the dashed block of FIG. 1). There are included in the display area 101 a gate metal layer, a source/drain electrode metal layer, a conversion layer and a common electrode layer (not illustrated in the drawing).

The gate metal layer includes a gate electrode (not illustrated in the drawing) and a plurality of gate lines 103; the source/drain electrode metal layer includes a source (not illustrated in the drawing), a drain (not illustrated in the drawing) and a plurality of source lines (not illustrated in the drawing); the conversion layer includes a plurality of conversion lines (107, 109); and the common electrode layer includes a plurality of common electrodes 105 that are independent from one another. A first via hole 1031 exposing at least a part of the gate line 103 is provided on the gate line 103. A second via hole 1052 exposing at least a part of the common electrode 105 is provided on the common electrode 105. The plurality of gate lines 103 intersect the plurality of source lines, and the plurality of conversion lines have an extension direction substantially parallel to that of the plurality of source lines. In one embodiment, the plurality of conversion lines include a plurality of first conversion lines 107 electrically connected with the plurality of gate lines 103 via the first via hole 1031 and a plurality of second conversion lines 109 electrically connected with the plurality of the common electrodes 105 via the second via hole 1052.

It should be noted that in the embodiment illustrated in FIG. 1, the display area 101 is described with reference to an example having 9 common electrodes 105, 6 gate lines 103, 8 first conversion lines 107 and 9 second conversion lines 109 only. However, in an actual product, it may be designed freely according to the requirements of the product without being limited to the above case.

The non-display area in FIG. 1 further includes a shift register unit 111 supplying gate driving signal to the plurality of gate lines 103 via the plurality of first conversion lines 107 and a display touch control driving unit 113. The display touch control driving unit 113 supplies touch control driving signal to the plurality of common electrodes 105 via the plurality of second conversion lines 109 and/or senses touch control detection signal on the common electrodes 105 via the plurality of second conversion lines 109. This is because the common electrodes 105 may be multiplexed as the touch control driving electrodes as well as the touch control detecting electrode in the touch control display device illustrated in FIG. 1.

It should be noted that in the touch control display device illustrated in FIG. 1, the shift register unit 111 and the display touch control driving unit 113 are located under the display area 101. However, such a design is not intended to be limiting. The shift register unit 111 and the display touch control driving unit 113 may be both provided above the display area 101. The shift register unit 111 and the display touch control driving unit 113 may be located at the same side of the display area 101, or may be separately located at opposite sides of the display area 101. For example, in a case where the shift register unit 111 is located at an upper side of the display area 101 and the display touch control driving unit 113 is located at a lower side of the display area 101, the shift register unit 111 still supplies gate driving signal to the plurality of gate lines 103 via the first conversion lines 107, and the display touch control driving unit 113 still supplies touch control driving signal to the plurality of common electrodes 105 via the second conversion lines 109 and/or senses touch control detection signal on the common electrodes 105 via the plurality of second conversion lines 109. In addition, the display touch control driving unit 113 provides control signal to the shift register unit 111 via a plurality of control lines. In this case, the plurality of control lines (not illustrated in the drawing) electrically connecting the shift register unit 111 and the display touch control driving unit 113 are located at the left side and/or the right side of the display area 101. Preferably, the shift register unit 111 and the display touch control driving unit 113 are located in the same side or opposite sides of the display area 101. Such a design may maximize the narrowing of the bezel.

Figure 2:
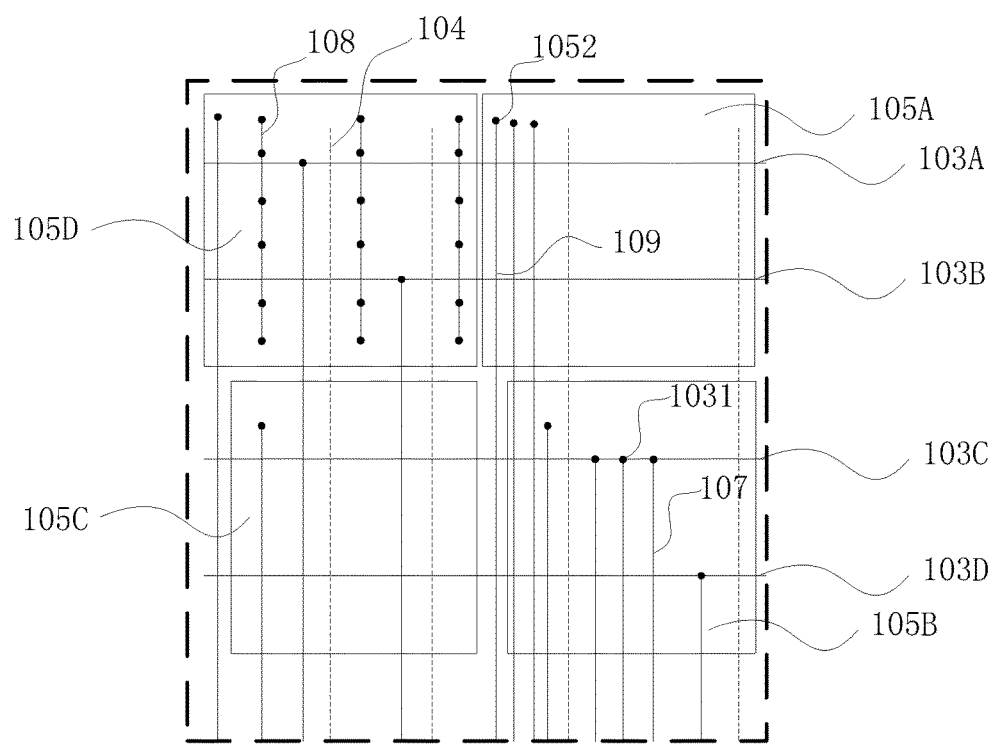
FIG. 2 is a partial enlarged view of area A in FIG. 1.

FIG. 2 is a partial enlarged view of area A in FIG. 1, in which an area occupied by arbitrary four common electrodes 105A, 105B, 105C and 105D is taken as an example. With reference to FIG. 1, the touch control display device includes a base substrate 11 and a plurality of source lines 104 intersecting the gate lines 103A, 103B, 103C and 103D. It should be noted that only four gate lines are exemplarily illustrated in FIG. 2, but it is not limited thereto. Likewise, only four source lines 104 are illustrated in FIG. 2, but it is not limited thereto. A sub pixel (not illustrated in FIG. 2) is defined at an intersection of one gate line 103 and one source line 104, and the plurality of conversion lines (the first conversion line 107 and the second conversion line 109) have an extension direction parallel to that of the plurality of source lines 104. It should be noted that although the source lines 104 and the plurality of conversion lines (the first conversion line 107 and the second conversion line 109) are parallel in a plane in FIG. 2, there is no overlapped area between their projection shadows on the base substrate 11 in the vertical direction. However, the present disclosure is not limited to the technical solution illustrated in FIG. 2. In certain embodiments, the plurality of conversion lines (the first conversion line 107 and the second conversion line 109) may have projection shadows on the base substrate 11 in the vertical direction at least partly overlap those of the plurality of source lines 104, or the plurality of conversion lines (the first conversion line 107 and the second conversion line 109) may have projection shadows on the base substrate 11 in the vertical direction at least partly overlap that of a black matrix (not illustrated in the drawing). Such a design may further increase the aperture ratio.

It should be noted that, in the partial enlarged view illustrated in FIG. 2, any first conversion line is electrically connected to only one gate line. For example, the first conversion line 107 may not be electrically connected to other gate lines 103A, 103B and 103D while being electrically connected to the gate line 103C. On the contrary, any gate line is electrically connected to at least one of the first conversion lines. For example, gate line 103C may be simultaneously electrically connected to three first conversion lines 107 via the first via hole 1031, respectively (in this embodiment, three first conversion lines 107 are taken as an example, however, it is not limited to three, but may be arbitrarily designed according to the requirements of the product without limitation). Such a design may increase single transmission stability by transmitting gate scan signal to a same gate line simultaneously with a plurality of first conversion lines.

It should be noted that, in the partial enlarged view illustrated in FIG. 2, any second conversion line is electrically connected to only one common electrode. For example, the second conversion line 109 may not be electrically connected to other common electrodes 105B, 105C and 105D while being electrically connected to the common electrode 105A. On the contrary, any common electrode is electrically connected to at least one of the second conversion lines. For example, common electrode 105A may be simultaneously electrically connected to three second conversion lines 109 via the second via hole 1052, respectively. In this embodiment, three second conversion lines 109 are illustrated by way of example. It will be appreciated that the number of second conversion lines 109 is not limited to three, but may be arbitrarily designed according to the requirements of the product without limitation. Such a design may increase single transmission stability and detection stability by transmitting touch control driving signal to a same common electrode, or sensing touch control detection signal on the same common electrode, simultaneously with a plurality of second conversion lines.

It should be noted that, in the partial enlarged view illustrated in FIG. 2, a plurality of redundant lines are included. The plurality of redundant lines are substantially parallel to the plurality of conversion lines, and any redundant line is electrically connected to only one common electrode. For example, as illustrated in FIG. 2, three redundant lines 108 are provided substantially parallel to the first conversion lines 107 and the second conversion lines 109. It should be noted that one redundant line 108 may not be electrically connected to other common electrodes 105A, 105B and 105C while being electrically connected to the common electrode 105D. Any common electrode is electrically connected to at least one of the redundant lines. The redundant line has a resistivity smaller than that of the common electrode. For example, in FIG. 2, the common electrode 105D may be simultaneously electrically connected to three redundant lines 108 via the via holes, respectively. In this embodiment, three redundant lines 108 are illustrated by way of example. It should be noted that the number of redundant lines 108 is not limited to three, but may be arbitrarily designed according to the requirements of the product without limitation. In addition, the redundant lines 108 have a resistivity smaller than that of the common electrode. The redundant lines 108 as well as the first conversion lines 107 and the second conversion lines 109 are obtained by patterning the conversion layer (it can also be understand that the redundant lines 108 as well as the first conversion lines 107 and the second conversion lines 109 are manufactured by the same material and by the same manufacture procedure), and typically, the first conversion lines 107 and the second conversion lines 109 are formed of low resistivity material such as metal. Each independent common electrode is connected to a plurality of redundant lines, respectively, thereby further lowering a resistance of the common electrode and improving touch control characteristics of the common electrode.

It should be further noted that, in the partial enlarged view illustrated in FIG. 2, three first conversion lines 107 that are electrically connected to the gate line 103C are exemplarily depicted on the gate line 103C. However, this is not intended to be limiting. With respect to each of the other gate lines, such as gate lines 103A, 103B and 103D, there may be any number of first conversion lines 107 that are electrically connected thereto. Even though those lines are not depicted in FIG. 2 for clarity, this is not intended to be limiting. Likewise, only three second conversion lines 109 that are electrically connected to the common electrode 105A are exemplarily depicted on the common electrode 105A. With respect to each of the other common electrodes 105B, 105C and 105D, there may be any number of second conversion lines 109 that are electrically connected thereto. Even though those lines are not depicted in FIG. 2 for clarity, this is not intended to be limiting. Likewise, only three redundant lines 108 that are electrically connected to the common electrode 105D are exemplarily depicted on the common electrode 105D. With respect to each of the other common electrodes 105A, 105B and 105C, there may be any number of redundant lines 108 that are electrically connected thereto. Even though those lines are not depicted in FIG. 2 for clarity, this is not intended to be limiting.

Figure 3:
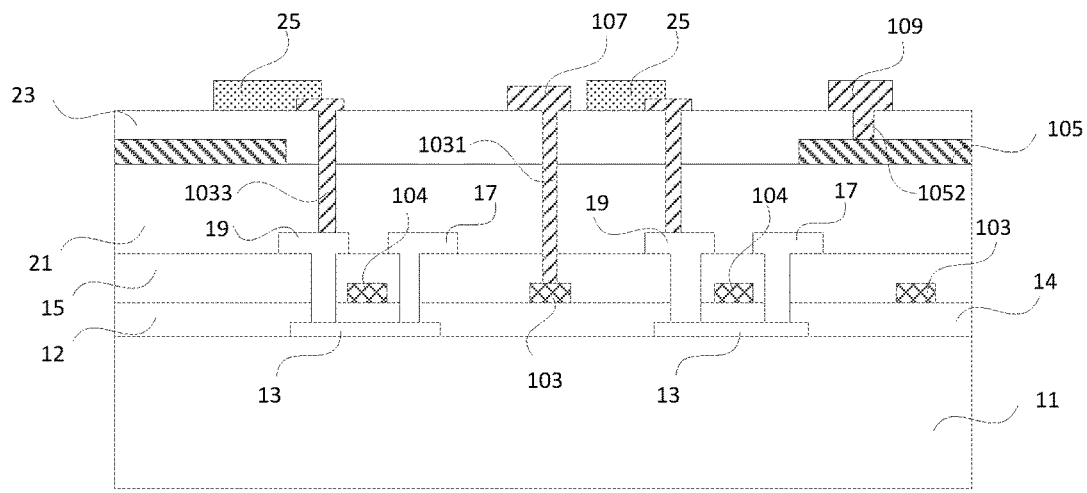
FIG. 3 is a sectional view of a touch control display device provided in an embodiment of the present disclosure.

FIG. 3 is a partial sectional view of a touch control display device provided in an embodiment of the present disclosure. In particular, FIG. 3 provides a structural sectional view of two adjacent sub pixels, including: a base substrate 11; a semiconductor layer 13 provided on the base substrate 11, wherein the semiconductor layer 13 includes a source region and a drain region; an interlayer insulation layer 12 provided on the semiconductor layer; a gate metal layer provided on the interlayer insulation layer 12, wherein the gate metal layer includes a gate electrode 104 and a plurality of gate lines 103; a first insulation layer 15 provided on the gate metal layer; a source/drain electrode metal layer provided on the first insulation layer 15, wherein the source/drain electrode metal layer includes a source electrode 17, a drain electrode 19 and a plurality of source lines (not illustrated in FIG. 3); a second insulation layer 21 provided on the source/drain electrode metal layer, wherein the second insulation layer 21 covers the source electrode 17 and the drain electrode 19; a common electrode layer provided on the second insulation layer 21, wherein the common electrode layer includes a plurality of common electrodes 105 that are independent from one another; a third insulation layer 23 provided on the common electrodes 105 and the second insulation layer 21; a conversion layer provided on the third insulation layer 23, wherein the conversion layer includes a first conversion line 107 and a second conversion line 109; and a first via hole 1031 and a second via hole 1052, wherein the first via hole 1031 penetrates the first insulation layer 15, the second insulation layer 21 and the third insulation layer 23, and the second via hole 1052 penetrates the third insulation layer 23, and wherein the first conversion line 107 is electrically connected to the gate line 103 via the first via hole 1031, and the second conversion line 109 is electrically connected to the common electrode 105 via the second via hole 1052.

In particular, the sectional structure of the touch control display device illustrated in FIG. 3 further includes: a pixel electrode layer provided on the third insulation layer 23, wherein the pixel electrode layer includes a plurality of pixel electrodes 25; and a third via hole 1033 provided on the source electrode 17 or the drain electrode 19, wherein the third via hole 1033 penetrates the second insulation layer 21 and the third insulation layer 23 and exposes at least a portion of the source electrode 17 or the drain electrode 19, and wherein the pixel electrode 25 is electrically connected to the source electrode 17 or the drain electrode 19 via the third via hole 1033. With such a design, the shift register unit 111 supplies gate driving signal to the plurality of gate lines 103 via a plurality of first conversion lines 107, and the display touch control driving unit 113 supplies touch control driving signal to the plurality of common electrodes 105 via the plurality of second conversion lines 109 and/or senses touch control detection signal on the common electrodes 105 via the plurality of second conversion lines 109. Since both the first conversion line 107 and the second conversion line 109 are provided in the display area 101 instead of being provided in the bezels area at the left and right sides of the display area 101, a narrow bezel may be obtained while ensuring the display and touch control function.

Figure 4:
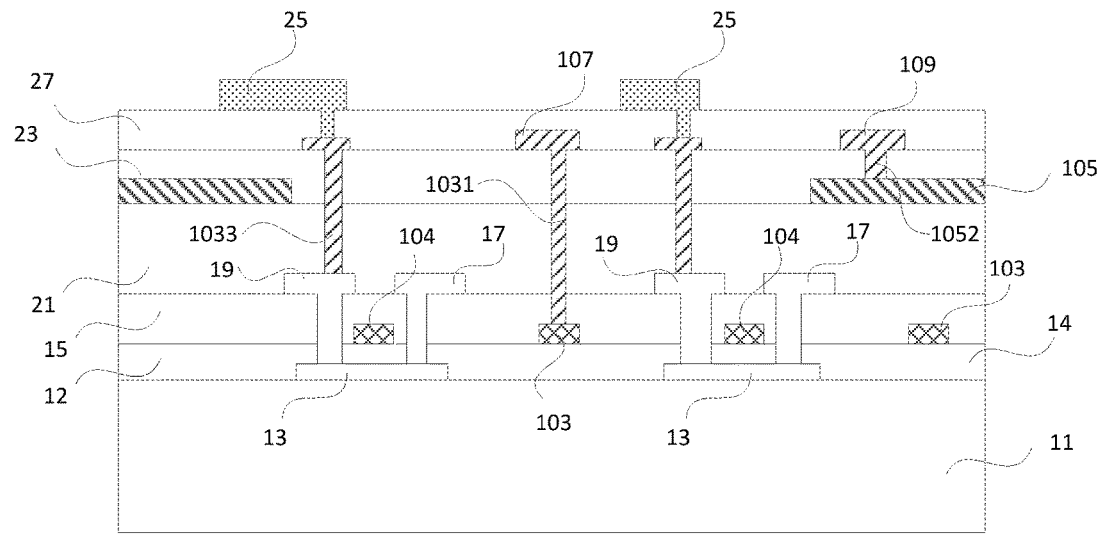
FIG. 4 is a sectional view of another touch control display device provided in an embodiment of the present disclosure.

FIG. 4 illustrates a sectional view of another touch control display device provided in an embodiment of the present disclosure. In particular, FIG. 4 provides a structural sectional view of two adjacent sub pixels, including: a base substrate 11; a semiconductor layer 13 provided on the base substrate 11, wherein the semiconductor layer 13 includes a source region and a drain region; an interlayer insulation layer 12 provided on the semiconductor layer; a gate metal layer provided on the interlayer insulation layer 12, wherein the gate metal layer includes a gate electrode 104 and a plurality of gate lines 103; a first insulation layer 15 provided on the gate metal layer; a source/drain electrode metal layer provided on the first insulation layer 15, wherein the source/drain electrode metal layer includes a source electrode 17, a drain electrode 19 and a plurality of source lines (not illustrated in FIG. 4); a second insulation layer 21 provided on the source/drain electrode metal layer, wherein the second insulation layer 21 covers the source electrode 17 and the drain electrode 19; a common electrode layer provided on the second insulation layer 21, wherein the common electrode layer includes a plurality of common electrodes 105 that are independent from one another; a third insulation layer 23 provided on the common electrodes 105 and the second insulation layer 21; a conversion layer provided on the third insulation layer 23, wherein the conversion layer includes a first conversion line 107 and a second conversion line 109; and a first via hole 1031 and a second via hole 1052, wherein the first via hole 1031 penetrates the first insulation layer 15, the second insulation layer 21 and the third insulation layer 23, and the second via hole 1052 penetrates the third insulation layer, and wherein the first conversion line 107 is electrically connected to the gate line 103 via the first via hole 1031, and the second conversion line 109 is electrically connected to the common electrode 105 via the second via hole 1052. It further includes: a protection layer 27 provided on the third insulation layer 23 and the plurality of conversion lines (the first conversion line 107 and the second conversion line 109), wherein the protection layer 27 is preferably formed of an insulation material, and the protection layer 27 covers the plurality of conversion lines (the first conversion line 107 and the second conversion line 109); and a pixel electrode 25, provided on the protection layer 27. It differs from the touch control display device provided in FIG. 3 further in that: in the touch control display device provided in FIG. 4, the third via hole 1033 penetrates the second insulation layer 21, the third insulation layer 23 and the protection layer 27, and exposes at least a portion of the source electrode 17 or the drain electrode 19, and wherein the pixel electrode 25 is electrically connected to the source electrode 17 or the drain electrode 19 via the third via hole 1033. With such a design, by referring to FIG. 1, the shift register unit 111 supplies gate driving signal to the plurality of gate lines 103 via a plurality of first conversion lines 107, and the display touch control driving unit 113 supplies touch control driving signal to the plurality of common electrodes 105 via the plurality of second conversion lines 109 and/or senses touch control detection signal on the common electrodes 105 via the plurality of second conversion lines 109. Since both the first conversion line 107 and the second conversion line 109 are provided in the display area 101 instead of being provided in the bezels area at the left and right sides of the display area 101, a narrow bezel may be obtained while ensuring the display and touch control function. In addition, in the touch control display device provided in FIG. 4, the protection layer 27 is provided on the plurality of conversion lines (the first conversion line 107 and the second conversion line 109), thereby facilitating the protection of the plurality of conversion lines (the first conversion line 107 and the second conversion line 109) from being exposed to the surface of the touch control display device.

Figure 5:
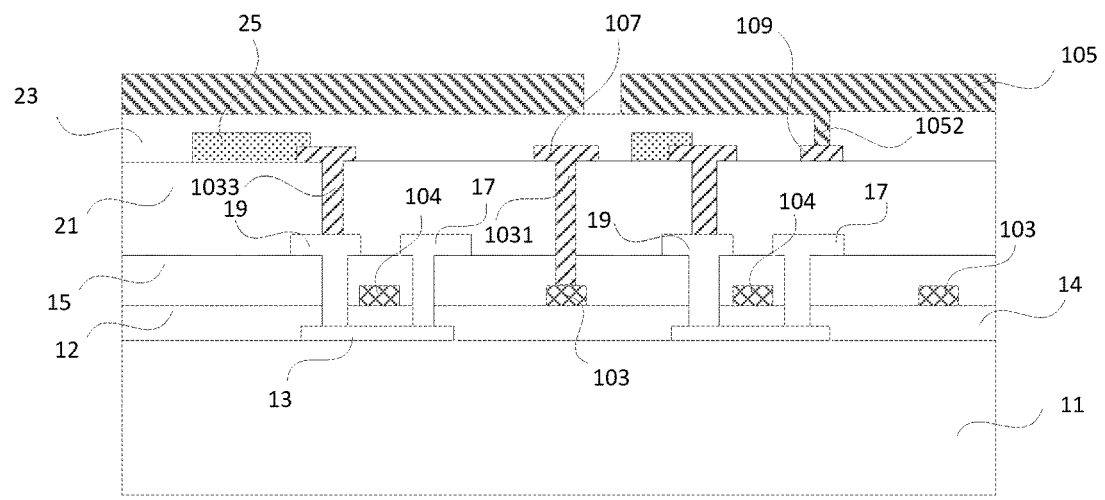
FIG. 5 is a sectional view of another touch control display device provided in an embodiment of the present disclosure.

FIG. 5 illustrates a sectional view of another touch control display device provided in an embodiment of the present disclosure. In particular, FIG. 5 provides a structural sectional view of two adjacent sub pixels, including: a base substrate 11; a semiconductor layer 13 provided on the base substrate 11, wherein the semiconductor layer 13 includes a source region and a drain region; a gate metal layer provided on the semiconductor layer 13, wherein the gate metal layer includes a gate electrode 104 and a plurality of gate lines 103; a first insulation layer 15 provided on the gate metal layer; a source/drain electrode metal layer provided on the first insulation layer 15, wherein the source/drain electrode metal layer includes a source electrode 17, a drain electrode 19 and a plurality of source lines (not illustrated in FIG. 5); a second insulation layer 21 provided on the source/drain electrode metal layer, wherein the second insulation layer 21 covers the source electrode 17 and the drain electrode 19; a conversion layer provided on the second insulation layer 21, wherein the conversion layer includes a plurality of conversion lines (the first conversion line 107 and the second conversion line 109); a third insulation layer 23 provided on the plurality of conversion lines (the first conversion line 107 and the second conversion line 109), wherein the third insulation layer 23 covers the plurality of conversion lines (the first conversion line 107 and the second conversion line 109) and the second insulation layer 21; a common electrode layer provided on the third insulation layer 23, wherein the common electrode layer includes a plurality of common electrodes 105 that are independent from one another; and a first via hole 1031 and a second via hole 1052, wherein the first via hole 1031 penetrates the first insulation layer 15 and the second insulation layer 21 and exposes at least a portion of the gate line 103, and the second via hole 1052 penetrates the third insulation layer 23, and wherein a plurality of first conversion lines 107 are electrically connected to the plurality of gate lines 103 via the first via hole 1031, and a plurality of second conversion lines 109 are electrically connected to the plurality of common electrodes 105 via the second via hole 1052. In comparison with the touch control display device provided in FIG. 4, the touch control display device design provided in FIG. 5 does not require an additional protection layer covering the plurality of conversion lines (the first conversion line 107 and the second conversion line 109), thereby reducing the manufacturing process cost.

In particular, the touch control display device illustrated in FIG. 5 further includes: a pixel electrode 25, interposed between the conversion line (the first conversion line 107 and the second conversion line 109) and the third insulation layer 23; and a third via hole 1033 provided on the source electrode 17 or the drain electrode 19, wherein the third via hole 1033 penetrates the second insulation layer 21 and exposes at least a portion of the source electrode 17 or the drain electrode 19, and wherein the pixel electrode 25 is electrically connected to the source electrode 17 or the drain electrode 19 via the third via hole 1033.

Figure 6:
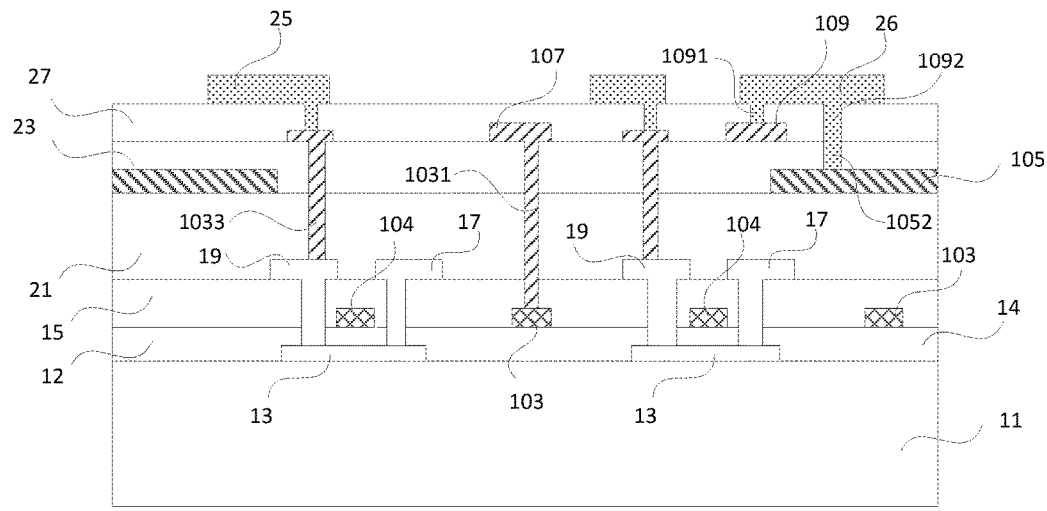
FIG. 6 is a sectional view of another touch control display device provided in an embodiment of the present disclosure.

It should be noted that, with respect to the touch control display device provided above in FIGS. 3, 4 and 5, the second conversion line 109 and the common electrode 105 are electrically connected via the second via hole 1052 penetrating the third insulation layer 23. However, the electrical connection means of the second conversion line 109 and the common electrode 105 is not limited thereto; and in certain embodiments, a film layer structure of the touch control display device may be provided as illustrated in the embodiment shown in FIG. 6. That is, the second conversion line 109 and the common electrode 105 may not directly contacted and electrically connected via a via hole; and instead, they may be electrically connected via an intermediate dielectric, such as electrically connected by the intermediate dielectric 26 in the same layer with the pixel electrode 25 shown in FIG. 6. As shown in FIG. 6, the second conversion line 109 may be electrically connected to the intermediate dielectric 26 via a fourth via hole 1091 penetrating the protection layer 27, and the intermediate dielectric is electrically connected to the common electrode 105 via a fifth via hole 1092 penetrating the protection layer 27 and the third insulation layer 23, thereby electrically connecting the second conversion line 109 with the common electrode 105.

Nevertheless, the touch control display device provided in the embodiment illustrated in FIG. 6 is only an example of the electrical connection between the second conversion line 109 and the common electrode 105. It should be understood neither the technical solution illustrated in FIG. 6 nor the shapes depicted in FIG. 6 are intended to be limiting. In certain embodiments, other film layers may be used as the intermediate dielectric for the electrical connection between the second conversion line 109 and the common electrode 105, which are not illustrated in FIG. 6 for clarity.

It should be noted that, all the thin film transistors in the touch control display devices provided in FIGS. 3, 4, 5 and 6 may have a top gate structure. However, the present disclosure is not limited to the top gate structure, and a bottom gate structure or other structures may be applied. In the present specification, the top gate structure is provided by way of example without limitation.

It should be further noted that, in the touch control display devices provided in FIGS. 3, 4, 5 and 6 above, the electrical connection means (contact means) between the first conversion line 107 and the gate line 103 completely utilizes the patterned conversion layer (i.e., the first conversion line 107 and the second conversion line 109 are the same layer material) via the first via hole 1031, but that is not intended to be limiting. For example, the electrical connection means (contact means) between the first conversion line 107 and the gate line 103 may utilize the patterned conversion layer and the patterned source/drain electrode layer respectively filling the first via hole 1031, respectively. Similarly, the electrical connection means between the pixel electrode 25 and the source electrode 17 or drain electrode 19 is not limited to those illustrated above in FIGS. 3, 4, 5 and 6. A electrical connection means in which a multilayer conduction layer is used to fill the third via hole 1033 respectively may be utilized, which is omitted herein.

FIGS. 7A to 7I illustrate a manufacturing method of a touch control display device provided in an embodiment of the present disclosure, taking two adjacent sub pixels as an example, the method in particular includes the following steps.

Figure 7A:
FIGS. 7A to 7I illustrate a manufacturing method of a touch control display device provided in an embodiment of the present disclosure.

As illustrated in FIG. 7A, a base substrate 11 is provided.

Figure 7B:
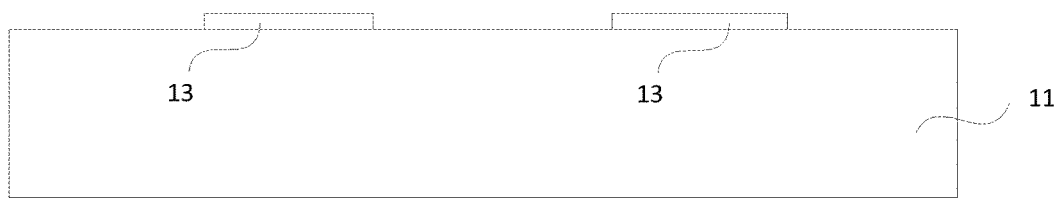

As illustrated in FIG. 7B, a semiconductor layer 13 is formed on the base substrate 11, wherein the semiconductor layer 13 includes a source region and a drain region.

Figure 7C:
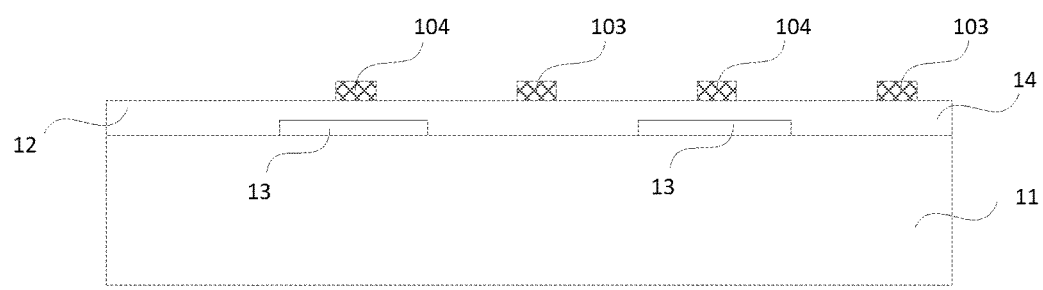

As illustrated in FIG. 7C, an interlayer insulation layer 12 is formed on the semiconductor layer 13, and a gate metal layer is formed on the interlayer insulation layer, wherein the gate metal layer is patterned to from a gate electrode 104 and a gate line 103 on the interlayer insulation layer 12.

Figure 7D:
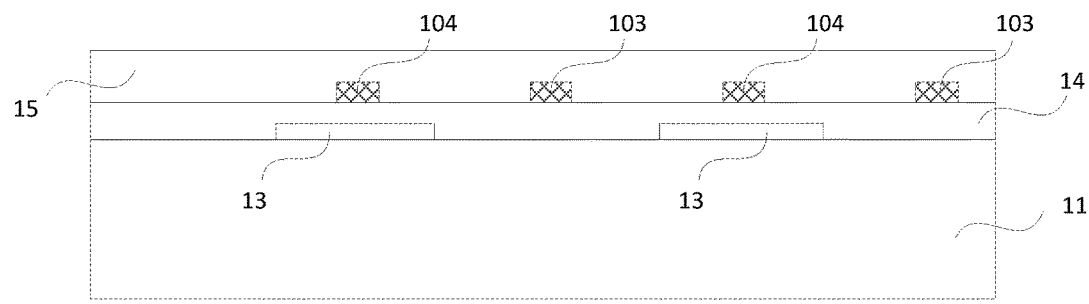

As illustrated in FIG. 7D, a first insulation layer 15 is formed on the gate electrode 104 and the gate line 103, wherein the first insulation layer covers the gate electrode 104 and the gate line 103.

Figure 7E:
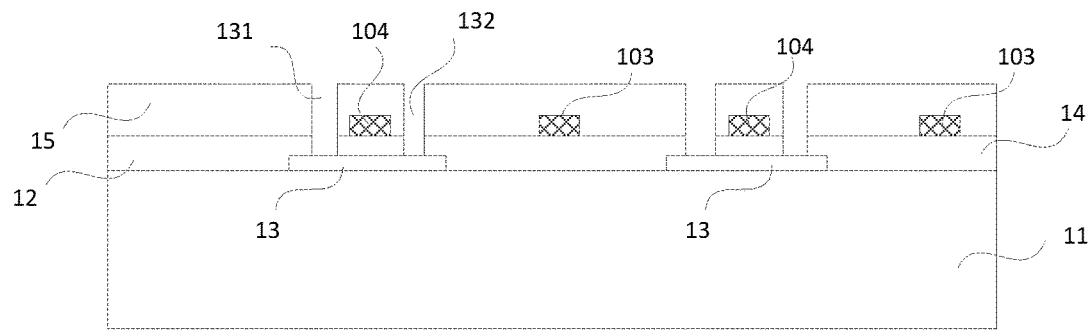

As illustrated in FIG. 7E, the interlayer insulation layer and the first insulation layer 15 are patterned to form a drain via hole 131 exposing the drain region and a source via hole 132 exposing the source region on the drain region and source region of the semiconductor layer, respectively.

Figure 7F:
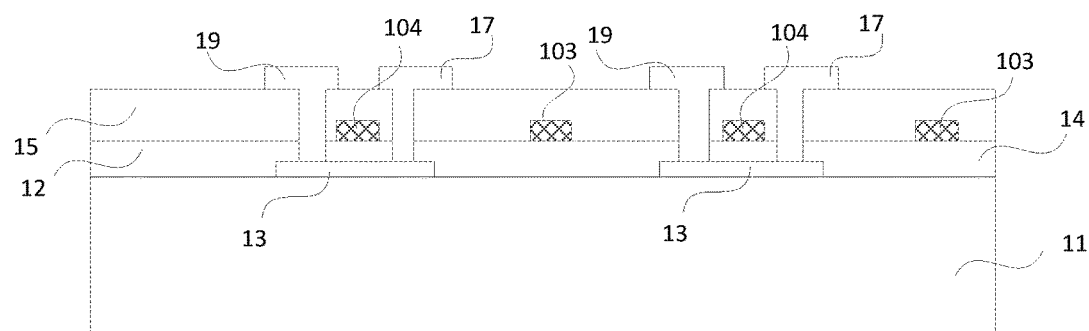

As illustrated in FIG. 7F, a source/drain electrode metal layer is formed on the first insulation layer, and the source/drain electrode metal layer is patterned to form a source electrode 17, a drain electrode 19 and a source line (not illustrated in the drawing), wherein the source electrode 17 is in contact with the source region via the source via hole 132, and the drain electrode 19 is in contact with the drain region via the drain via hole 131.

Figure 7G:
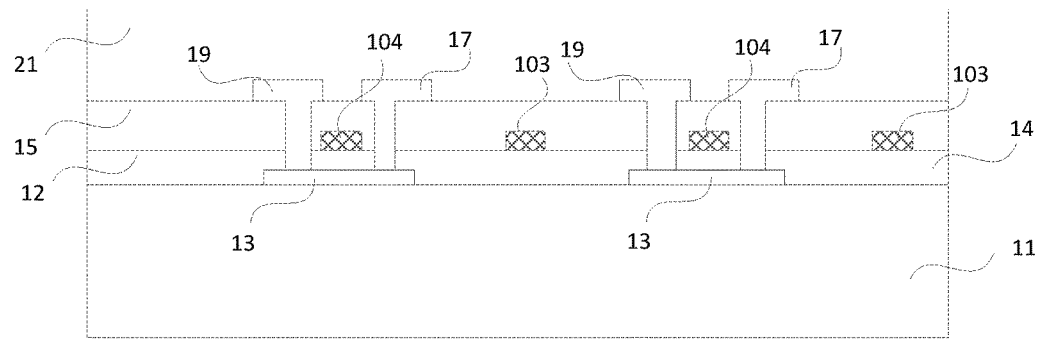

As illustrated in FIG. 7G, a second insulation layer 21 is formed on the source electrode 17, the drain electrode 19 and the source line (not illustrated in the drawing), wherein the second insulation layer 21 covers the source electrode 17, the drain electrode 19 and the source line (not illustrated in the drawing).

Figure 7H:
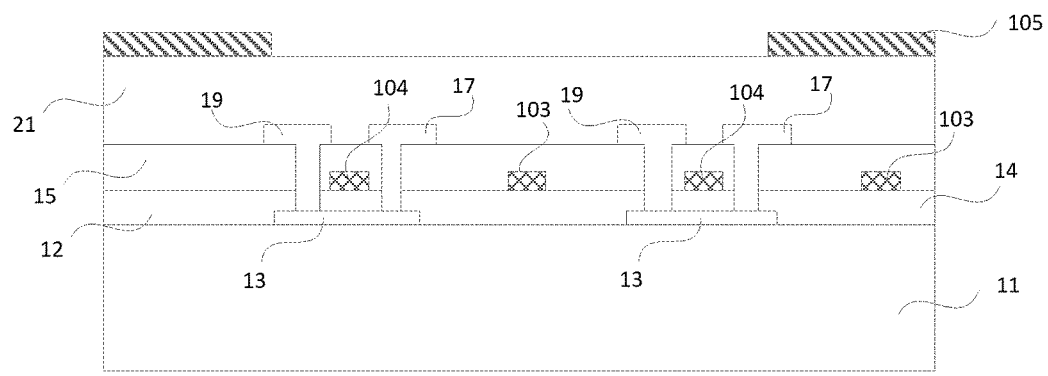

As illustrated in FIG. 7H, a common electrode layer is formed on the second insulation layer 21, and the common electrode layer is patterned to form a plurality of common electrodes 105 that are independent from one another, wherein the common electrode layer is generally formed of transparent metal material such as ITO (Indium Tin Oxide) and the like.

Figure 7I:
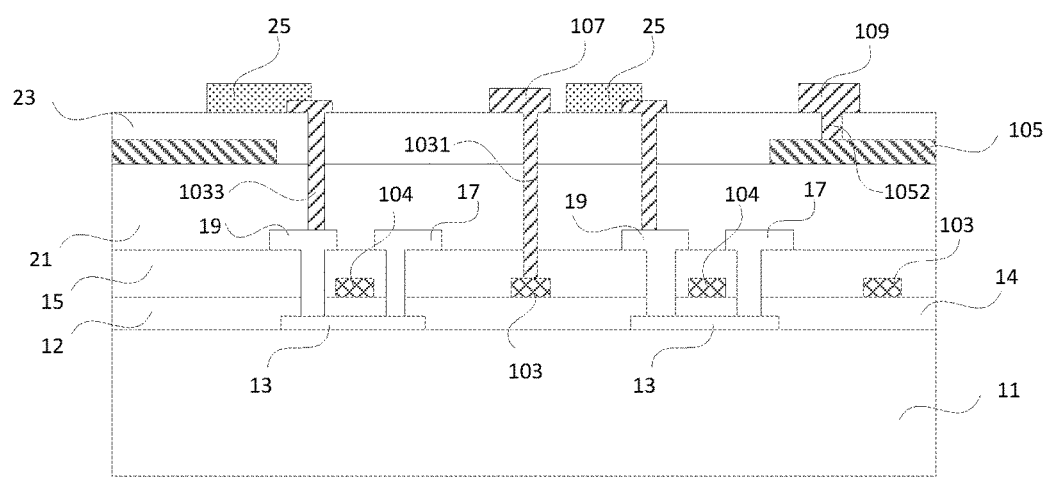

As illustrated in FIG. 7I, a third insulation layer 23 is formed on the second insulation layer 21 and the common electrode 105. The first insulation layer 15, the second insulation layer 21 and the third insulation layer 23 are patterned to form a first via hole 1031 exposing at least a portion of the gate line 103 on the gate line 103. The third insulation layer 23 is patterned to form on the common electrode 105 a second via hole 1052 that exposes at least a portion of the common electrode 105. The second insulation layer 21 and third insulation layer 23 are patterned to form on the drain electrode 19 a third via hole 1033 that exposes at least a portion of the drain electrode 19. A pixel electrode layer and a conversion layer are formed on the third insulation layer 23, and the pixel electrode layer and the conversion layer are patterned to form a pixel electrode 25, a first conversion line 107 and a second conversion line 109 on the third insulation layer 23, wherein the first conversion line 107 is electrically connected to the gate line 103 via the first via hole 1031, the second conversion line 109 is electrically connected to the common electrode 105 via the second via hole, and the pixel electrode 25 is electrically connected to the drain electrode 19 via the third via hole 1033.

In the manufacturing method of the touch control display device provided in FIGS. 7A to 7I, with reference to FIG. 1, the shift register unit 111 supplies gate driving signal to the plurality of gate lines 103 via the plurality of first conversion lines 107, and the display touch control driving unit 113 supplies touch control driving signal to the plurality of common electrodes 105 via the plurality of second conversion lines 109 and/or senses touch control detection signal on the common electrodes 105 via the plurality of second conversion lines 109. Since both the first conversion line 107 and the second conversion line 109 are provided in the display area 101 instead of being provided in the bezels area at the left and right sides of the display area 101, a narrow bezel may be obtained while ensuring the display and touch control function.

Figure 8A:
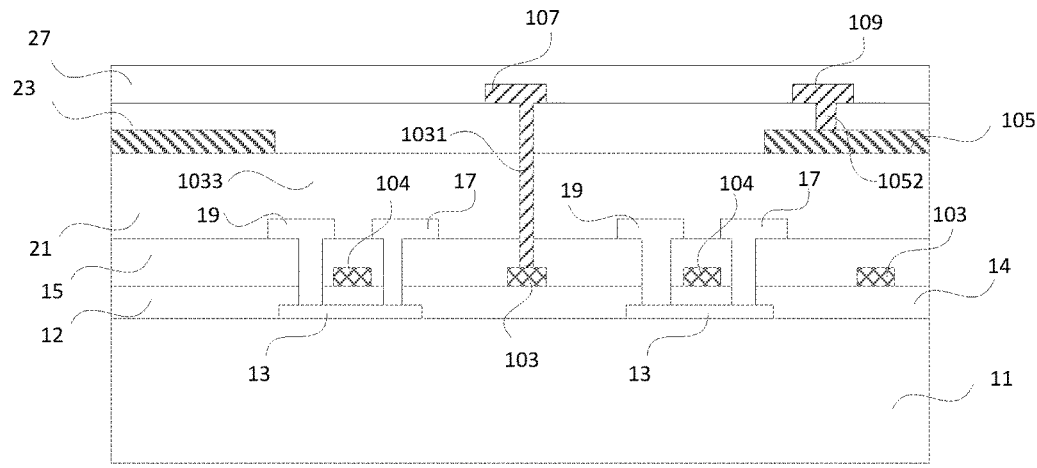
FIGS. 8A and 8B illustrate a manufacturing method of another touch control display device provided in an embodiment of the present disclosure.
Figure 8B:
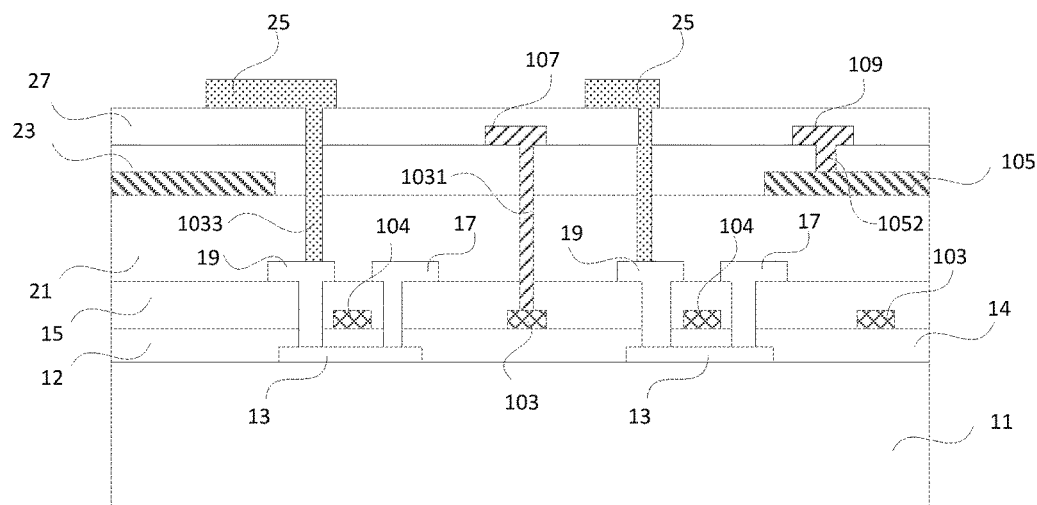

It should be noted that, in the manufacturing method of the touch control display device provided in FIGS. 7A to 7I, as illustrated in FIG. 7H, after forming the common electrode layer on the second insulation layer 21 and patterning the common electrode layer to form the plurality of common electrodes 105 that are independent from one another, the steps illustrated in FIGS. 8A and 8B may be performed.

In particular, as illustrated in FIG. 8A, a third insulation layer 23 is formed on the second insulation layer 21 and the common electrode 105. The first insulation layer 15, the second insulation layer 21 and the third insulation layer 23 are patterned to form on the gate line 103 a first via hole 1031 that exposes at least a portion of the gate line 103. The third insulation layer 23 is patterned to form on the common electrode 105 a second via hole 1052 that exposes at least a portion of the common electrode 105. A conversion layer is formed on the third insulation layer 23, and the conversion layer is patterned to form a first conversion line 107 and a second conversion line 109 on the third insulation layer 23, wherein the first conversion line 107 is electrically connected to the gate line 103 via the first via hole 1031, and the second conversion line 109 is electrically connected to the common electrode 105 via the second via hole. A protection layer 27 is formed on the third insulation layer 23, the first conversion line 107 and the second conversion line 109, wherein the protection layer 27 covers the first conversion line 107 and the second conversion line 109.

As illustrated in FIG. 8B, the protection layer 27, the third insulation layer 23 and the second insulation layer 21 are patterned to form on the drain electrode 19 a third via hole 1033 that exposes at least a portion of the drain electrode 19. A pixel electrode layer is formed on the protection layer 27, and the pixel electrode layer is patterned to form a pixel electrode 25 that is electrically connected to the drain electrode 19 via the third via hole 1033. In one embodiment, the protection layer 27 is formed of an insulation material such as silicon nitride and the like. The protection layer 27 is provided on the first conversion line 107 and the second conversion line 109, thereby facilitating the protection of the first conversion line 107 and the second conversion line 109 from being exposed to the surface of the touch control display device.

FIGS. 9A to 9J illustrate a manufacturing method of a touch control display device provided in an embodiment of the present disclosure, taking two adjacent sub pixels as an example, the method in particular includes the following steps.

Figure 9A:
FIGS. 9A to 9J illustrate a manufacturing method of another touch control display device provided in an embodiment of the present disclosure.

As illustrated in FIG. 9A, a base substrate 11 is provided.

Figure 9B:
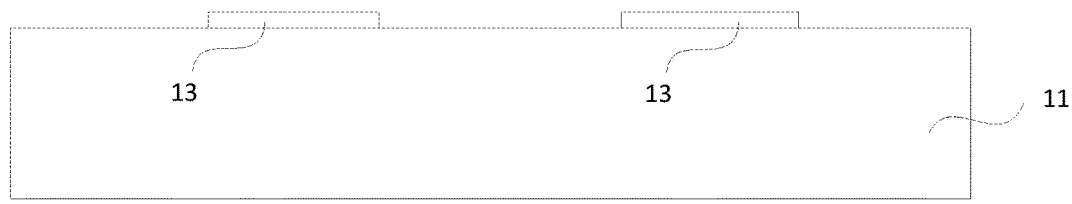

As illustrated in FIG. 9B, a semiconductor layer 13 is formed on the base substrate 11, wherein the semiconductor layer 13 includes a source region and a drain region.

Figure 9C:
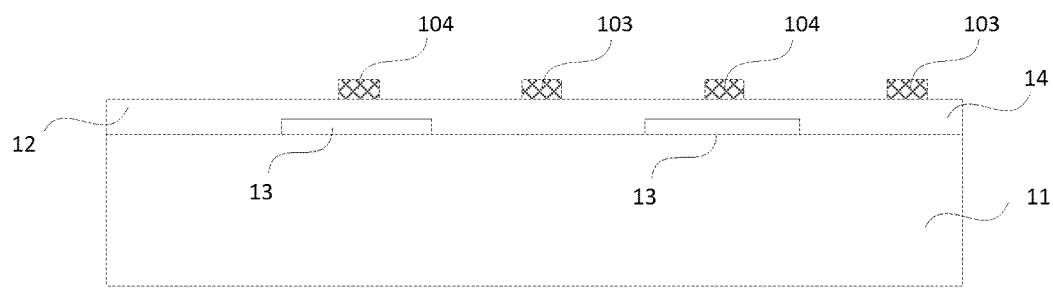

As illustrated in FIG. 9C, an interlayer insulation layer 12 is formed on the semiconductor layer 13, and a gate metal layer is formed on the interlayer insulation layer, wherein the gate metal layer is patterned to form a gate electrode 104 and a gate line 103 on the interlayer insulation layer 12.

Figure 9D:
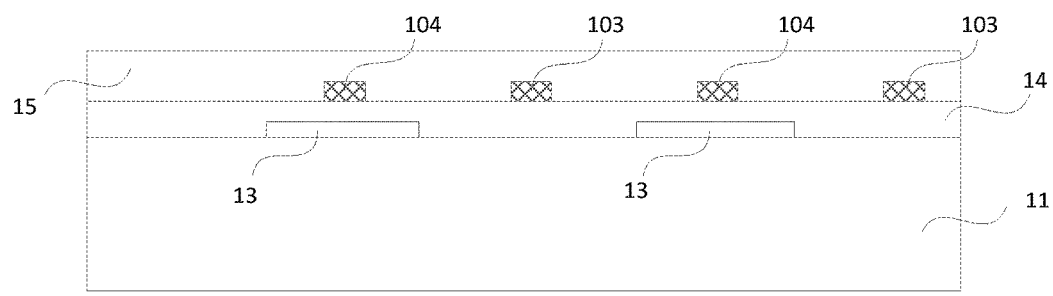

As illustrated in FIG. 9D, a first insulation layer 15 is formed on the gate electrode 104 and the gate line 103, wherein the first insulation layer covers the gate electrode 104 and the gate line 103.

Figure 9E:
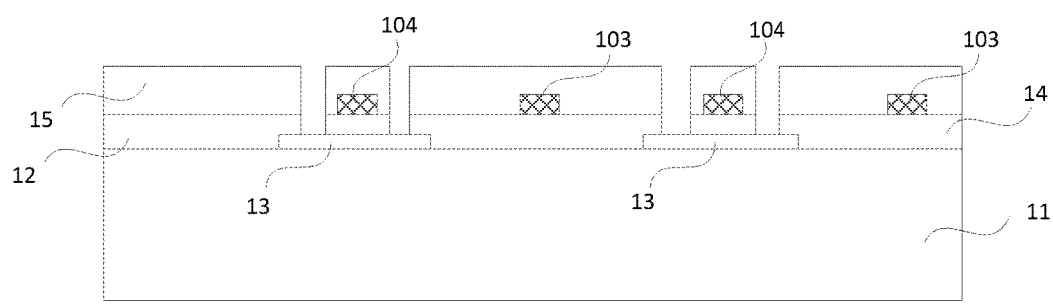

As illustrated in FIG. 9E, the interlayer insulation layer and the first insulation layer 15 are patterned to form a drain via hole 131 exposing the drain region and a source via hole 132 exposing the source region on the drain region and source region of the semiconductor layer, respectively.

Figure 9F:
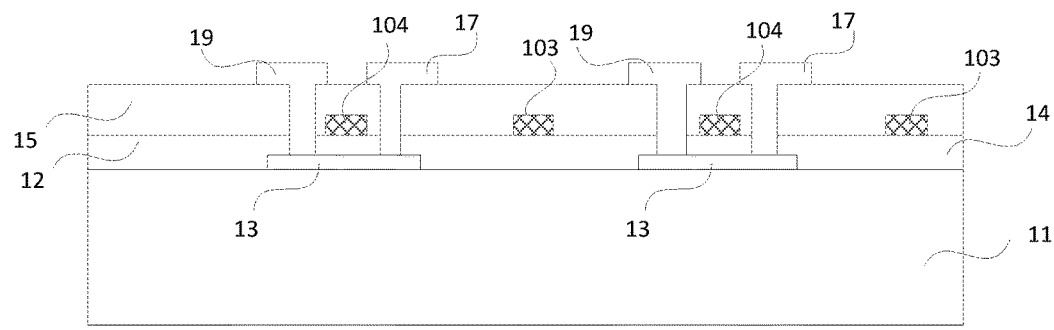
Figure 9G:
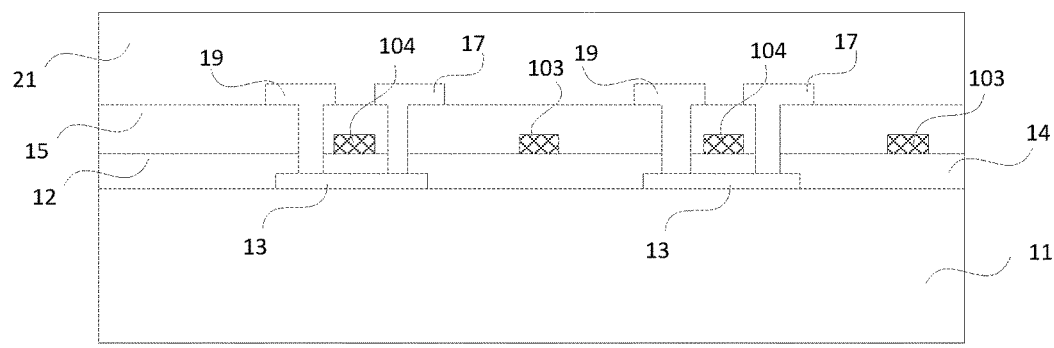

As illustrated in FIG. 9F, a source/drain electrode metal layer is formed on the first insulation layer, and the source/drain electrode metal layer is patterned to form a source electrode 17, a drain electrode 19 and a source line (not illustrated in the drawing), wherein the source electrode 17 is in contact with the source region via the source via hole 132, and the drain electrode 19 is in contact with the drain region via the drain via hole 131.

As illustrated in FIG. 9C, a second insulation layer 21 is formed on the source electrode 17, the drain electrode 19 and the source line (not illustrated in the drawing), wherein the second insulation layer 21 covers the source electrode 17, the drain electrode 19 and the source line (not illustrated in the drawing).

Figure 9H:
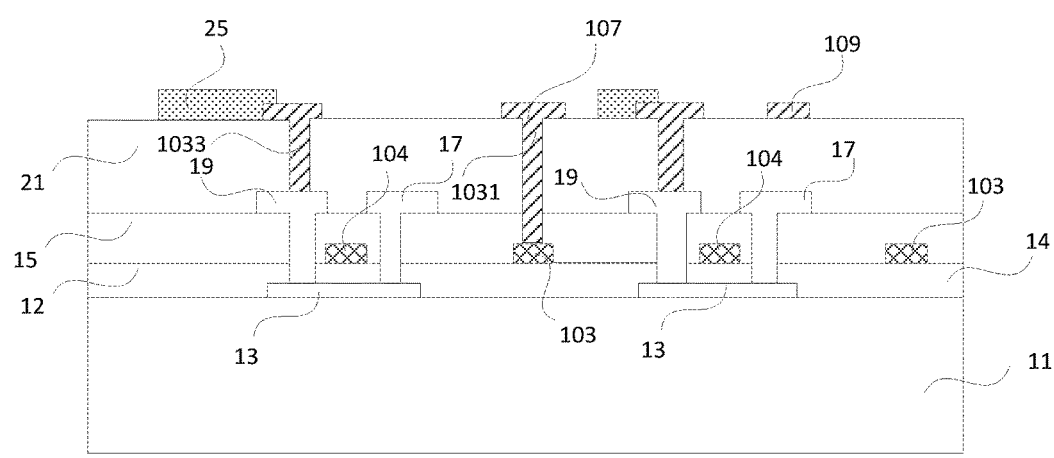

As illustrated in FIG. 9H, the first insulation layer 15 and the second insulation layer 21 are patterned to form on the gate line 103 a first via hole 1031 that exposes at least a portion of the gate line 103. The second insulation layer 21 is patterned to form on the drain electrode 19 a third via hole 1033 that exposes at least a portion of the drain electrode 19. A pixel electrode layer and a conversion layer are formed on the second insulation layer 21, and the pixel electrode layer and the conversion layer are patterned to form on the second insulation layer 21 a pixel electrode 25, a first conversion line 107 electrically connected to the gate line 103 via the first via hole 1031 and a second conversion line 109 electrically connected to the drain electrode 19 via the third via hole.

Figure 9I:
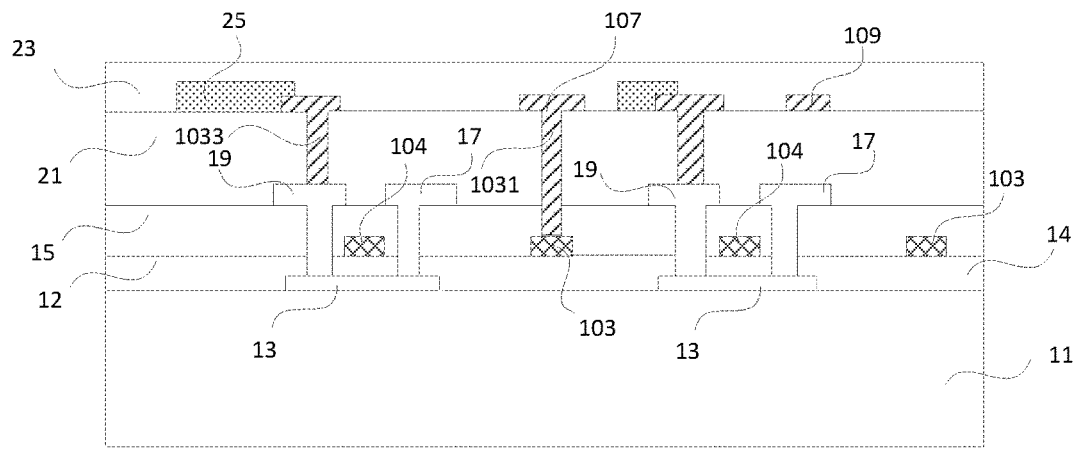

As illustrated in FIG. 9I, a third insulation layer 23 is formed on the pixel electrode 25, the first conversion line 107 and the second conversion line 109.

Figure 9J:
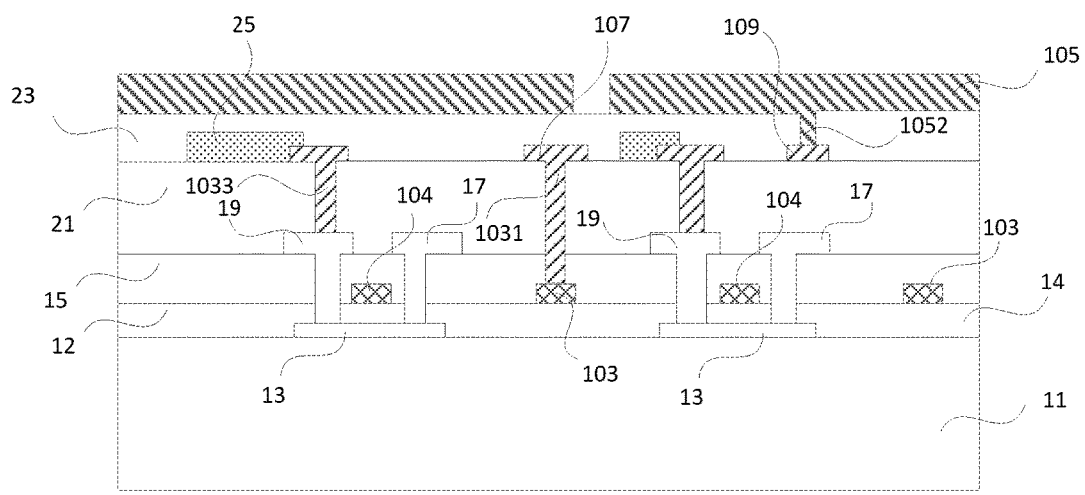

As illustrated in FIG. 9J, the third insulation layer 23 is patterned to form a second via hole 1052 on the second conversion line 109. A common electrode layer is formed on the third insulation layer 23, and the common electrode layer is patterned to form on the third insulation the plurality of layer common electrodes 105 that are independent from one another and are electrically connected to the second conversion line 109 via the second via hole 1052.

In the manufacturing method of the touch control display device provided in FIGS. 9A to 9I, with reference to FIG. 1, the shift register unit 111 supplies gate driving signal to the plurality of gate lines 103 via the plurality of first conversion lines 107, and the display touch control driving unit 113 supplies touch control driving signal to the plurality of common electrodes 105 via the plurality of second conversion lines 109 and/or senses touch control detection signal on the common electrodes 105 via the plurality of second conversion lines 109. Since both the first conversion line 107 and the second conversion line 109 are provided in the display area 101 instead of being provided in the bezels area at the left and right sides of the display area 101, a narrow bezel may be obtained while ensuring the display and touch control function.

It should be noted that, in the manufacturing method of the touch control display device provided in FIGS. 7A to 7I, since the first via hole 1031 penetrates the first insulation layer 15, the second insulation layer 21 and the third insulation layer 23, the first via hole 1031 is formed on the gate line 103 using a technical solution in which the first insulation layer 15, the second insulation layer 21 and the third insulation layer 23 are patterned together. However, the present disclosure is not limited thereto. In certain embodiments, the first insulation layer 15 may be first patterned, then the second insulation layer 21 may be patterned, and after that, the third insulation layer 23 may be patterned, thereby forming the first via hole 1031. Similarly, such a technical solution is also applicable for forming the second via hole 1052 and the third via hole 1033. That is, the technical solutions for forming the first via hole 1031, the second via hole 1052 and the third via hole 1033 provided in FIGS. 8A to 8B and FIGS. 9A to 9J are not limited thereto, as long as it is ensured that: the first via hole 1031 is formed on the gate line 103 and exposes at least a portion of the gate line 103, and the first conversion line 107 is electrically connected to the gate line 103 via the first via hole 1031; the second via hole 1052 is formed on the common electrode 105 and exposes at least a portion of the common electrode 105, and the second conversion line 109 is electrically connected to the common electrode 105 via the second via hole 1052; and the third via hole 1033 is formed on the drain electrode 19 and exposes at least a portion of the drain electrode 19, and the pixel electrode 25 is electrically connected to the drain electrode 19 via the third via hole 1033.

The touch control display device and the manufacturing method thereof provided in the embodiments of the present disclosure have been described in detail above. In the context, particular examples are provided to describe the principle and implementation of the present disclosure, which are provided for a better understanding of the method and core concept of the present disclosure. Meanwhile, to those ordinary skilled in the art, the detailed implementations and the field of application may be variously modified. Accordingly, the present specification should not be interpreted as limitation of the present disclosure.

What is claimed is:

1. A touch control display device, comprising:
a display area and a non-display area, the display area comprising a gate metal layer, a source/drain metal layer, a conversion layer and a common electrode layer, the gate metal layer comprising a gate electrode and a plurality of gate lines, the source/drain metal layer comprising a source electrode, a drain electrode and a plurality of source lines, the conversion layer comprising a plurality of conversion lines, and the common electrode layer comprising a plurality of common electrodes that are independent from one another,
wherein a first via hole is formed on the gate line and exposes at least a portion of the gate line, and a second via hole is formed on the common electrode and exposes at least a portion of the common electrodes,
wherein the plurality of gate lines intersect the plurality of source lines, and the plurality of conversion lines have an extension direction parallel to that of the plurality of source lines, and
wherein the plurality of conversion lines comprise a plurality of first conversion lines and a plurality of second conversion lines, the plurality of first conversion lines are electrically connected to the plurality of gate lines via the first via hole, and the plurality of second conversion lines are electrically connected to the plurality of common electrodes via the second via hole.

2. The touch control display device according to claim 1, further comprising a shift register unit and a display touch control driving unit, wherein the shift register unit is configured to supply gate driving signal to the plurality of gate lines via the plurality of first conversion lines, and the display touch control driving unit is configured to supply touch control driving signal to the plurality of common electrodes via the plurality of second conversion lines and/or to sense a touch control detection signal on the common electrodes via the plurality of second conversion lines.

3. The touch control display device according to claim 2, wherein the shift register unit and the display touch control driving unit are located at a same side or opposite sides of the display area.

4. The touch control display device according to claim 1, wherein the touch control display device comprises a base substrate, and the plurality of conversion lines have projection shadows on the base substrate in the vertical direction at least partly overlap those of the plurality of source lines.

5. The touch control display device according to claim 1, wherein a first insulation layer is covered on the gate line, a second insulation layer covers the source electrode and the drain electrode, and a third insulation layer covers the second insulation layer and the common electrode, wherein the source electrode and drain electrode are formed on the first insulation layer, and the common electrode is formed on the second insulation layer, and wherein the first via hole penetrates the first insulation layer, the second insulation layer and the third insulation layer, and the second via hole penetrates the third insulation layer.

6. The touch control display device according to claim 5, further comprising a pixel electrode disposed on the third insulation layer and a third via hole provided on the source electrode or the drain electrode, wherein the third via hole penetrates the second insulation layer and the third insulation layer and exposes at least a portion of the source electrode or the drain electrode, and the pixel electrode is electrically connected to the source electrode or the drain electrode via the third via hole.

7. The touch control display device according to claim 5, further comprising a protection layer located on the third insulation layer and the plurality of conversion lines, a pixel electrode provided on the protection layer and a third via hole provided on the source electrode or the drain electrode, wherein the protection layer covers the plurality of conversion lines, the third via hole penetrates the second insulation layer, the third insulation layer and the protection layer and exposes at least a portion of the source electrode or the drain electrode, and the pixel electrode is electrically connected to the source electrode or the drain electrode via the third via hole.

8. The touch control display device according to claim 1, wherein a first insulation layer is covered on the gate line, a second insulation layer covers the source electrode and the drain electrode, and a third insulation layer covers the conversion lines and the second insulation layer, wherein the source electrode and drain electrode are formed on the first insulation layer, the conversion lines are formed on the second insulation layer, and the common electrode is formed on the third insulation layer, and wherein the first via hole penetrates the first insulation layer, and the second insulation layer, and the second via hole penetrates the third insulation layer.

9. The touch control display device according to claim 8, further comprising a pixel electrode interposed between the conversion lines and the third insulation layer and a third via hole provided on the source electrode or the drain electrode, wherein the third via hole penetrates the second insulation layer and exposes at least a portion of the source electrode or the drain electrode, and pixel electrode is electrically connected to the source electrode or the drain electrode via the third via hole.

10. The touch control display device according to claim 1, wherein any one of the first conversion lines is electrically connected to only one of the gate lines.

11. The touch control display device according to claim 10, wherein any one of the gate lines is electrically connected to at least one of the first conversion lines.

12. The touch control display device according to claim 1, wherein any one of the second conversion lines is electrically connected to only one of the common electrodes.

13. The touch control display device according to claim 12, wherein any one of the common electrodes is electrically connected to at least one of the second conversion lines.

14. The touch control display device according to claim 1, wherein the conversion layer further comprises a plurality of redundant lines that are parallel to the plurality of conversion lines, and any one of the redundant lines is electrically connected to only one of the common electrodes.

15. The touch control display device according to claim 14, wherein any one of the common electrodes is electrically connected to at least one of the redundant lines, and the redundant lines have a resistivity smaller than that of the common electrodes.

* * * * *